US012671294B2

(12) United States Patent
Fischer et al.

(10) Patent No.: US 12,671,294 B2
(45) Date of Patent: Jun. 30, 2026

(54) OIL-EVACUATED ELECTRICAL MACHINE HAVING ROLLING BEARINGS, FOR A MOTOR VEHICLE

(71) Applicant: Schaeffler Technologies AG & Co. KG, Herzogenaurach (DE)

(72) Inventors: Alexandre Fischer, Strasbourg (FR); Thomas Fritz, Rheinstetten (DE); Andreas Keskinoglu, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 296 days.

(21) Appl. No.: 17/620,389

(22) PCT Filed: May 25, 2020

(86) PCT No.: PCT/DE2020/100441
§ 371 (c)(1),
(2) Date: Dec. 17, 2021

(87) PCT Pub. No.: WO2020/259742
PCT Pub. Date: Dec. 30, 2020

(65) Prior Publication Data
US 2022/0247260 A1 Aug. 4, 2022

(30) Foreign Application Priority Data
Jun. 25, 2019 (DE) .......................... 102019117071.0

(51) Int. Cl.
| | |
|---|---|
| *H02K 5/173* | (2006.01) |
| *B60L 50/00* | (2019.01) |
| *F16C 19/16* | (2006.01) |
| *F16C 33/58* | (2006.01) |

(Continued)

(52) U.S. Cl.
CPC ........... *H02K 5/1732* (2013.01); *F16C 19/16* (2013.01); *F16C 33/583* (2013.01); *H02K 5/15* (2013.01);
(Continued)

(58) Field of Classification Search
CPC ........ H02K 5/1732; H02K 5/15; H02K 7/083; F16C 19/16; F16C 33/583; F16C 2380/26;
(Continued)

(56) References Cited

U.S. PATENT DOCUMENTS

| | | | |
|---|---|---|---|
| 9,970,450 B1 * | 5/2018 | Kelly | .................... F04D 29/284 |
| 2007/0177835 A1 | 8/2007 | Verhaegen | |

(Continued)

FOREIGN PATENT DOCUMENTS

| | | |
|---|---|---|
| CH | 212488 A | 11/1940 |
| CN | 1934282 A | 3/2007 |

(Continued)

*Primary Examiner* — Christopher M Koehler
*Assistant Examiner* — Riley Owen Stout
(74) *Attorney, Agent, or Firm* — Volpe Koenig

(57) ABSTRACT

An electrical machine (10) for an electrically operable axle of a motor vehicle, having a shaft (12) with an axis of rotation (D), at least one bearing (14), wherein the shaft is rotatably mounted via the at least one bearing, at least one end shield (16), and at least one bearing ring (18), which is arranged coaxially with the axis of rotation (D). The at least one bearing is connected to the end shield via the bearing ring, and the bearing ring has at least one longitudinal recess (20a, 20b) on the outside for fluid evacuation. An electrically operated axle for a motor vehicle having the electrical machine is also provided.

15 Claims, 2 Drawing Sheets

(51) Int. Cl.
      *H02K 5/15*      (2006.01)
      *H02K 7/08*      (2006.01)
(52) U.S. Cl.
      CPC .............. *H02K 7/083* (2013.01); *B60L 50/00* (2019.02); *F16C 2380/26* (2013.01)
(58) Field of Classification Search
      CPC .. F16C 35/045; F16C 35/067; F16C 2326/06; F16C 33/6622; F16C 33/6685; F16C 33/586; F16C 33/58; F16C 33/6625; B60L 50/00
      See application file for complete search history.

(56)             References Cited

U.S. PATENT DOCUMENTS

| | | | | |
|---|---|---|---|---|
| 2009/0101424 A1 | 4/2009 | Suzuki | | |
| 2011/0268381 A1* | 11/2011 | Hamada | ................ | F16C 33/586 |
| | | | | 384/569 |
| 2015/0176647 A1* | 6/2015 | Lee | ..................... | F16C 33/6659 |
| | | | | 384/473 |
| 2016/0118856 A1* | 4/2016 | Mukai | ................... | F16C 33/762 |
| | | | | 310/90 |
| 2017/0063191 A1* | 3/2017 | Kirkley, Jr. | .......... | F16C 35/045 |

FOREIGN PATENT DOCUMENTS

| | | |
|---|---|---|
| EP | 1541884 | 6/2005 |
| EP | 2177777 | 4/2010 |
| JP | S5543357 | 3/1980 |
| JP | S61116123 | 6/1986 |
| JP | H077880 A | 1/1995 |
| JP | 2008044439 A | 2/2008 |
| JP | 5212142 | 6/2013 |
| JP | 2014163485 | 9/2014 |
| WO | 2014090251 | 6/2014 |
| WO | 2015072471 | 5/2015 |

\* cited by examiner

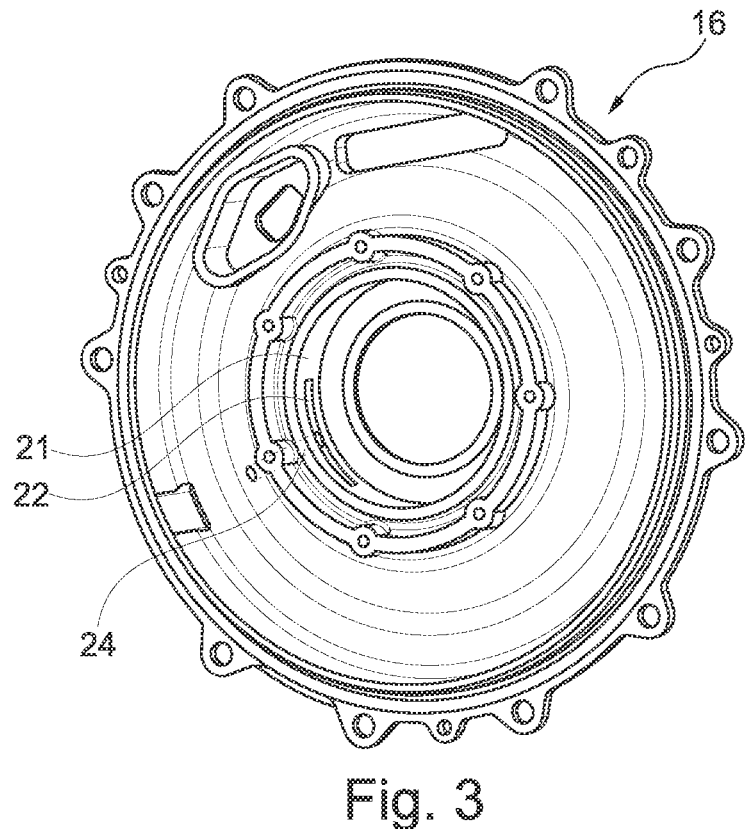
Fig. 3
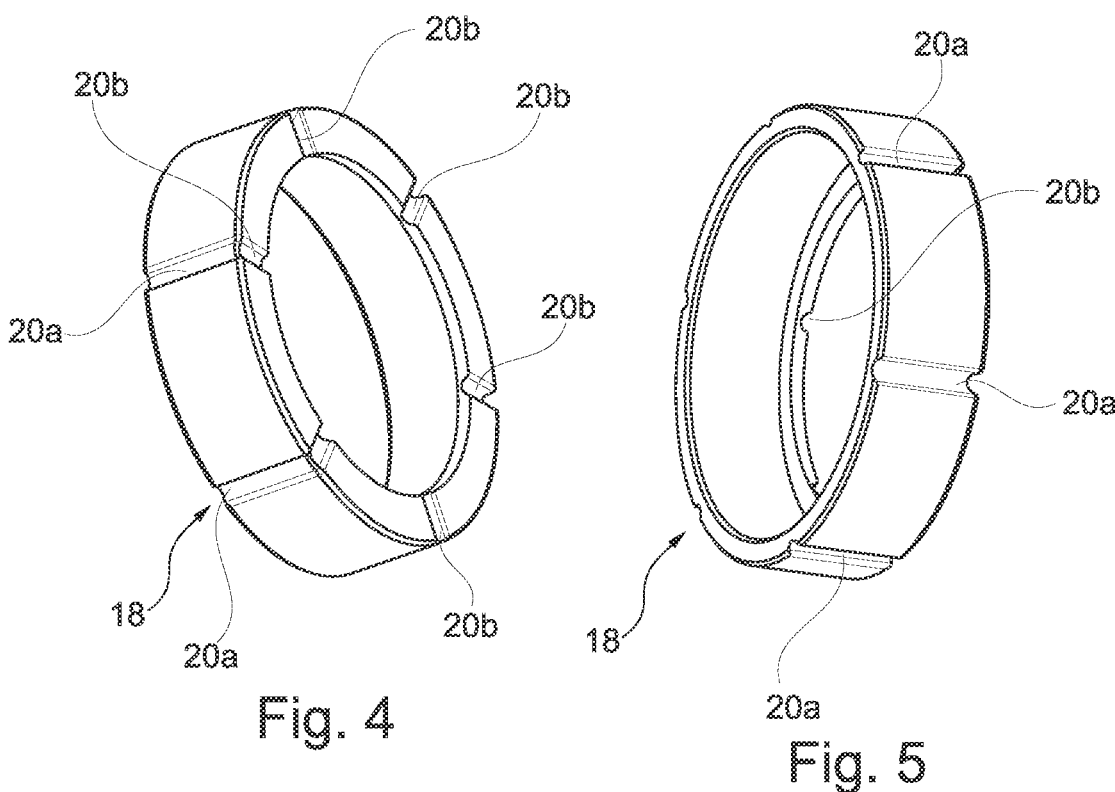
Fig. 4
Fig. 5

OIL-EVACUATED ELECTRICAL MACHINE HAVING ROLLING BEARINGS, FOR A MOTOR VEHICLE

CROSS-REFERENCE TO RELATED APPLICATIONS

This application is the U.S. National Phase of PCT Appln. No. PCT/DE2020/100441, filed May 25, 2020, which claims priority from German Patent Application No. 10 2019 117 071.0, filed Jun. 25, 2019, the entire disclosures of which are incorporated by reference herein.

TECHNICAL FIELD

The disclosure relates to an electrical machine for an electrically operable axle of a motor vehicle. The electrical machine includes a shaft that is rotatably mounted through at least one rolling bearing.

The field of application of the disclosure extends primarily to electrical machines having rolling bearings that are installed in at least partially or completely electrically driven motor vehicles. An at least partially or completely electrically driven motor vehicle is to be understood as a mild hybrid, full hybrid, plug-in hybrid or electric vehicle. An electrical machine is to be understood as an electric motor having a stator and a rotor.

The disclosure also relates to an electrically operable axle for a motor vehicle having an electrical machine.

BACKGROUND

Particularly in the field of electromobility, requirements arise as a result of changed usage profiles compared to conventional drive concepts. For electric vehicles, for example, longer times of use, for example as a result of increased use of car sharing, place increased demands on the resulting storage. Both oil and grease-lubricated rolling bearings are important here. The electrical machine can be integrated into an electrical, that is to say electrically operated, axle. In the case of integration into a transmission, it is an electrified transmission.

In previously known electrical machines, however, oil collects as a fluid in the bearing region. Dirt, particles and abrasion can collect together with the oil. This can damage the bearing. In addition, there is a higher temperature in this region, which can also lead to damage. Furthermore, due to the high degree of integration of motor vehicle components, the installation space for all components and structural solutions is severely limited. As a result, a solution that is economical in terms of installation space is advantageous.

Other boundary conditions are also critical, for example high speeds, high power, and high operating temperatures. Another factor to be taken into account is the variety of applications, which differ only in the length of the rotor of the electrical machine or in the gear interface. These boundary conditions require a flexible, in particular modularly compatible, and cost-effective solution.

Examples of disadvantages to be overcome are, in particular, the collection point for dirt, particles, and abrasion, high temperature in the storage region, high costs for replacing the bearing, and laborious repairs to the bearing.

SUMMARY

It is therefore the object of the disclosure to create an improved electrical machine and an improved electrical axis having an electrical machine.

The object is achieved according to the disclosure by an electrical machine and an electrical axle with one or more of the features disclosed herein. Preferred embodiments are specified below and in the claims and the following description, each of which can either individually or in combination represent an aspect of the disclosure.

The disclosure thus relates to an electrical machine for an electrically operable axle of a motor vehicle, having a shaft with an axis of rotation, at least one bearing, wherein the shaft is arranged to be rotatably mounted through the at least one bearing, at least one end shield, at least one bearing ring which is coaxial with the axis of rotation, wherein the at least one bearing is connected to the end shield via the bearing ring, and wherein the bearing ring has on the outside thereof at least one longitudinal recess for fluid evacuation.

The disclosure also relates to an electrically operable axle for a motor vehicle having an aforementioned electrical machine.

The evacuation or discharge of a fluid, in particular an oil, from a region of a bearing, that is to say from a bearing region, within the electrical machine is enabled by recesses, for example grooves or channels, in a bearing ring. The fluid can flow through the recesses in the bearing ring, for example, into a collecting recess in an end shield, regardless of the position of the bearing ring. The bearing ring can be positioned on an end shield by means of a centering surface. The fluid can flow out through a hole in the end shield and therefore does not collect in the region of the bearing. In particular, the solution according to the disclosure enables a cost-efficient solution that is compact in terms of installation space and that can be used for evacuation of fluid, in particular oil, in the region of the bearing. The bearing is preferably a rolling bearing, particularly preferably a ball bearing. In addition, this solution according to the disclosure enables a high flexibility and can be installed in many different electrical machines, which differ either in terms of the active length, or power, and/or the transmission interface. The reliable functioning of the electrical machine is also advantageous.

An electrical machine is a machine used in electrical energy technology and represents a form of energy converter. A distinction is made between rotating electrical machines, including various types of electric motors and electrical generators, and stationary electrical machines, which include transformers. What all electrical machines have in common is that they have a magnetic circuit in the structure thereof, which is essential for the function thereof.

Electrical machines use the properties of electromagnetic interaction and are based on electromagnetic induction and magnetic force effects, which are described by the Lorentz force and, for some machine types, by the reluctance force.

For historical reasons, transformers belong to the group of stationary or static electrical machines, especially transformers that are used in the field of electrical power engineering, such as power transformers. In the case of stationary electrical machines, the magnetic force effects only play a subordinate or undesirable role, since no movements are carried out and the function of a transformer is to transform alternating voltages between different high voltage levels. In the much larger area of rotating electrical machines, exclusively shown in the following, which are characterized by a large number of different designs and areas of application, the magnetic force effects play the central role. They are used to convert electrical power into mechanical power on a shaft. If electrical power is converted into mechanical power, it is called an electric motor, if mechanical power is converted into electrical power in the opposite direction, it is called an electrical generator. Some electrical machine types can be operated both as a motor and as a generator; the specific function is determined by the operating range of the machine.

Electrical machines have differently arranged wire coils through which the electric current flows. The magnetic flux that occurs is guided in a targeted manner in an iron core, which is also referred to as a magnetic circuit. This core is made of materials that can conduct the magnetic flux, such as layered electrical sheet metal. The layering, together with the one-sided insulation of the sheet metal parts, serves to suppress undesired eddy currents. In rotating machines, the stator and rotor, also known as armature in some machines, are essential components. The forces generated in each of the two magnetic fields cause a targeted, one-time or continuous movement of the machine parts against each other.

For electrical insulation of the parts through which current flows from one another and from the external environment, electrical machines have insulation regions. Mechanical support structures and preferably bearings for guiding moving parts are used to mechanically stabilize the machine.

In electrical machines, bearing shields are usually the rear and front covers of the housing, which protect the inside of the machine against contact and accommodate the bearings of the shaft ends of the armature. They are precisely fitted into the stator housing to ensure that the air gap between the stator and armature is as uniform as possible. When removing the end shields for repairs or maintenance work, the installation position can therefore be marked so that they can be reassembled in exactly the same position when reassembling. An A-end shield preferably designates the output side and carries a fixed bearing, a B-end shield is preferably arranged on the fan side, wherein the bearing is carried out via a sliding seat to be able to compensate for thermal expansion of the armature.

The bearing can in particular be a rolling bearing, particularly preferably a ball bearing. The rolling bearing comprises an inner ring, an outer ring, and roller bodies arranged radially between the inner ring and the outer ring.

The bearing ring is preferably stamped, turned from a component, mechanically processed, made from cast, or manufactured using a similar manufacturing process.

According to a preferred embodiment, it is provided that the at least one longitudinal recess is arranged on the outer circumference of the bearing ring running in parallel to the axis of rotation. This creates a storage and flow space for accumulating fluid, wherein this fluid can be contaminated with abrasives. This enables a component-friendly solution with simple and inexpensive means.

According to a preferred embodiment, it is provided that the at least one longitudinal recess is arranged on an end face of the bearing ring running perpendicular to the axis of rotation. This creates a storage and flow space for accumulating fluid, wherein this fluid can be contaminated with abrasives. This enables a component-friendly solution with simple and inexpensive means.

According to a preferred embodiment, it is provided that at least one longitudinal recess parallel to the axis of rotation and at least one longitudinal recess perpendicular to the axis of rotation are aligned with one another, wherein the bearing ring preferably circumferentially has a plurality of longitudinal recesses, which are in particular evenly distributed over the circumference of the bearing ring. Arranged in alignment with one another means in the context of the disclosure that at least two longitudinal recesses arranged in this way each form a connection for fluid clearance. Fluid can thus be cleared along and across the axis of rotation.

According to a preferred embodiment, it is provided that the bearing ring is a separate component or an outer ring of the bearing. The design as a separate component enables the use of an inexpensive standard bearing. The design as a separate component enables a compact design.

According to a preferred embodiment, it is provided that the bearing ring is positioned by a centering surface on the end shield. This enables simple assembly and reliable evacuation of the fluid.

According to a preferred embodiment, it is provided that the end shield has at least one circumferentially extending collecting recess for receiving fluid. The at least one circumferentially extending collecting recess is arranged in particular in a region in which fluid collects by gravity and can flow away therefrom without external influence. Particularly preferably, fluid passes as directly as possible from the at least one longitudinal recess of the bearing ring into the collecting recess of the end shield.

According to a preferred embodiment, it is provided that the end shield has at least one radially extending radial recess, wherein the at least one radial recess preferably has a vertical main axis of extension. The vertical main axis of extension is to be understood as such a main axis of extension that enables fluid to flow away by gravity. Particularly preferably, fluid reaches the radial recess of the end shield as directly as possible from the collecting recess in the end shield. In particular, the radial recess guides the fluid out of the electrical machine. For this purpose, the radial recess can guide the fluid vertically or horizontally out of the electrical machine. Such a configuration enables a cost-effective, compact and at the same time reliable evacuation of fluid from the electrical machine.

According to a preferred embodiment, it is provided that the at least one longitudinal recess, the at least one collecting recess, and the at least one radial recess form a fluid channel to conduct fluid out of the electrical machine. Preferably, the longitudinal recess parallel to the axis of rotation and the longitudinal recess radially to the axis of rotation can be viewed as a common longitudinal recess. Such a configuration enables a cost-effective, compact and at the same time reliable evacuation of fluid from the electrical machine.

BRIEF DESCRIPTION OF THE DRAWINGS

In the following, the disclosure is explained by way of example with reference to the accompanying drawings using preferred exemplary embodiments, wherein the features shown below can represent an aspect of disclosure both individually and in combination. In the figures:

FIG. 3: shows an end shield for an electrical machine according to FIG. 2,

FIG. 4: shows a bearing ring for an electrical machine according to FIG. 2 in a first perspective view, and FIG. 5: shows the bearing ring according to FIG. 4 in a second perspective view.

DETAILED DESCRIPTION

Figure 1:
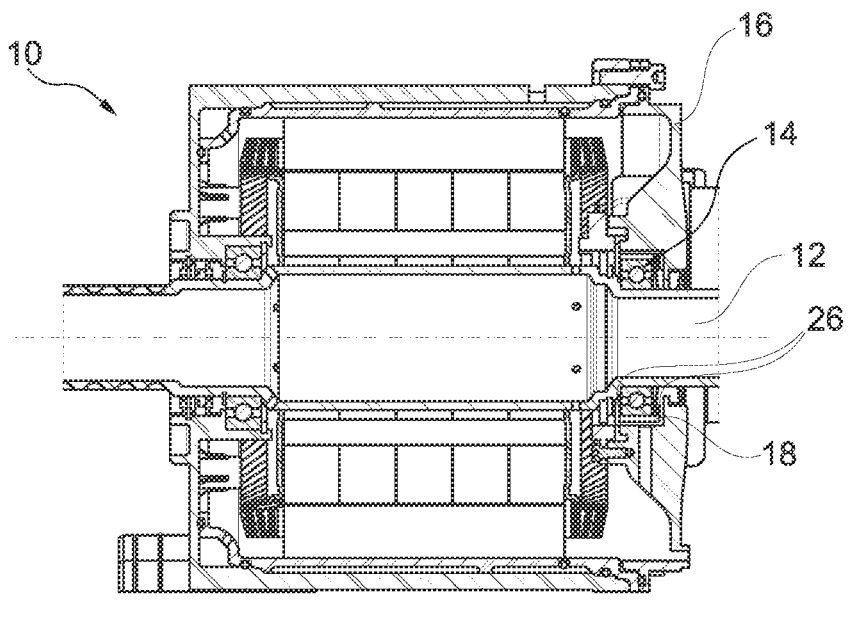
FIG. 1: shows an electrical machine according to the prior art.

FIG. 1 shows an electrical machine 10 for an electrically operable axle of a motor vehicle according to the prior art.

Figure 2:
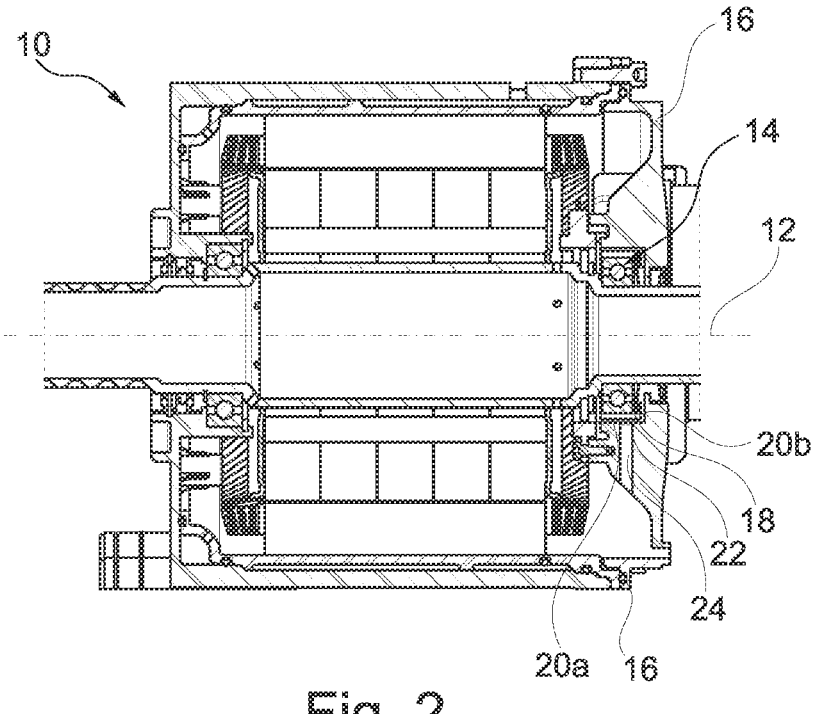
FIG. 2: shows an electrical machine according to a preferred embodiment.

FIG. 2 shows a preferably designed electrical machine 10 for an electrically operable axle of a motor vehicle, having a shaft 12 having an axis of rotation D, At least one bearing 14, wherein the shaft 12 is rotatably mounted through the at least one bearing 14, at least one end shield 16, at least one bearing ring 18, which is arranged coaxially to the axis of rotation D, wherein the at least one bearing 14 is connected to the end shield 16 via the bearing ring 18, and wherein the bearing ring 18 has a plurality of longitudinal recesses 20a, 20b on the outside thereof for fluid evacuation.

Through the large number of longitudinal recesses 20a, 20b in the bearing ring 18, the fluid, in particular oil, can flow into a collecting recess 22 arranged in the end shield 16. As a result, the fluid collects in the collecting recess 22. This is independent of the position of the bearing ring 18. The bearing ring 18 can be positioned on the end shield 16 by a centering surface. The fluid can then flow off through at least one radial recess 24 in the end shield 16 and no longer collects in the bearing region 26.

The illustrated end shield 16 is, for example, a B end shield. B end shields are preferably arranged on the fan side of an electrical machine 10.

According to a preferred embodiment, it is provided that a plurality of longitudinal recesses 20a are arranged on the outer circumference of the bearing ring 18 running in parallel to the axis of rotation D. This can be seen in FIGS. 2, 4, and 5.

According to a preferred embodiment, it is provided that a plurality of longitudinal recesses 20b is arranged on an end face of the bearing ring 18 running perpendicular to the axis of rotation D. This can be seen in FIGS. 2, 4, and 5.

According to a preferred embodiment, it is provided that a plurality of longitudinal recesses 20a are arranged in parallel to the axis of rotation D and a plurality of longitudinal recesses 20b are arranged to be perpendicular to the axis of rotation D in each case in alignment with one another. The longitudinal recesses 20a, 20b are in particular evenly distributed over the circumference of the bearing ring 18. This can be seen in FIGS. 4 and 5.

According to a preferred embodiment, it is provided that the bearing ring 18 is a separate component. This can be seen in FIGS. 2, 4, and 5.

According to a preferred embodiment, it is provided that the bearing ring 18 is positioned by a centering surface 21 on the end shield 16. This can be seen from FIGS. 2, 3, 4, and 5.

According to a preferred embodiment, it is provided that the end shield 16 has at least one circumferentially extending collecting recess 22 for receiving fluid. This can be seen in FIGS. 2 and 3.

According to a preferred embodiment, it is provided that the end shield 16 has at least one radially extending radial recess 24, wherein the at least one radial recess 24 preferably has a vertical main axis of extension. This can be seen in FIGS. 2 and 3.

According to a preferred embodiment, it is provided that the at least one longitudinal recess 20a, 20b, the at least one collecting recess 22, and the at least one radial recess 24 form a fluid channel to conduct fluid out of the electrical machine 10. This can be seen from FIGS. 2, 3, 4, and 5.

LIST OF REFERENCE SYMBOLS

10 Electrical machine
12 Shaft

14 Bearing
16 End shield
18 Bearing ring
20a Longitudinal recess parallel to the axis of rotation
20b Longitudinal recess radial to the axis of rotation
21 Centering surface
22 Collecting recess
24 Radial recess
26 Bearing region
D Axis of rotation of the shaft

The invention claimed is:

1. An electrical machine for an electrically operable axle of a motor vehicle, the electrical machine comprising:
   a shaft having an axis of rotation;
   at least one bearing, the shaft being rotatably mounted via the at least one bearing;
   at least one end shield including a centering surface and at least one radially extending aperture extending through an axially extending surface of the centering surface; and
   at least one bearing ring arranged coaxially to the axis of rotation, the at least one bearing being connected to the end shield via the bearing ring, and the bearing ring having at least one longitudinal recess configured for fluid evacuation, the at least one longitudinal recess is arranged on an outer circumference of the bearing ring and extends parallel to the axis of rotation uninterruptedly from a first axial end face to a second axial end face of the bearing ring, wherein the bearing ring directly contacts an outer ring of the bearing or the bearing ring is the outer ring of the bearing.

2. The electrical machine according to claim 1, wherein the at least one longitudinal recess is arranged on at least one of the first and second axial end faces of the bearing ring and extends perpendicular to the axis of rotation.

3. The electrical machine according to claim 2, wherein the at least one longitudinal recess extending parallel to the axis of rotation and the longitudinal recess that extends perpendicular to the axis of rotation are arranged in alignment with one another.

4. The electrical machine according to claim 1, wherein the bearing ring is positioned via the centering surface of the end shield.

5. The electrical machine according to claim 1, wherein the end shield has at least one circumferentially extending collecting recess configured for receiving fluid.

6. The electrical machine according to claim 1, wherein the at least one radially extending aperture has a vertical main axis of extension.

7. The electrical machine according to claim 1, wherein the bearing ring is positioned via the centering surface on the end shield, the end shield has at least one circumferentially extending collecting recess configured for receiving fluid, the at least one radially extending aperture has a vertical main axis of extension, and the at least one longitudinal recess, the at least one collecting recess, and the at least one radially extending aperture form a fluid channel configured to conduct fluid out of the electrical machine.

8. An electrically operated axle for a motor vehicle comprising the electrical machine according to claim 1.

9. The electrical machine according to claim 1, wherein the at least one longitudinal recess includes a plurality of longitudinal recesses which are evenly distributed over the outer circumference of the bearing ring.

10. An electrical machine for an electrically operable axle of a motor vehicle, the electrical machine comprising:

a shaft having an axis of rotation;

at least one bearing, the shaft being rotatably mounted via the at least one bearing;

at least one end shield; and at least one bearing ring including a generally hollow cylindrical shape, the at least one bearing ring is arranged coaxially to the axis of rotation and connected to the end shield via the bearing ring, and the bearing ring is positioned via a centering surface of the end shield, the bearing ring including:

at least one longitudinal recess extending in a radial direction perpendicular to the axis of rotation on an axial end face of the bearing ring; and at least one longitudinal recess extending in an axial direction parallel to the axis of rotation on an outer radial face of the bearing ring, wherein the at least one longitudinal recess extending in the radial direction is directly fluidly connected to the at least one longitudinal recess extending parallel to the axis of rotation, and the recesses are configured for fluid evacuation;

wherein the end shield has at least one circumferentially extending collecting recess extending into the centering surface and configured for receiving fluid, and the end shield has at least one radially extending radial recess extending through an axially extending surface of the centering surface, and the at least one radial recess extends in the radial direction.

11. The electrical machine of claim 10, wherein the bearing ring is a separate component or an outer ring of the bearing.

12. The electrical machine of claim 10, wherein the at least one longitudinal recess, the at least one collecting recess and the at least one radial recess form a fluid channel configured to conduct fluid out of the electrical machine.

13. The electrical machine according to claim 12, wherein the at least one longitudinal recess includes a plurality of longitudinal recesses which are evenly distributed over a circumference of the bearing ring.

14. The electrical machine of claim 10, wherein the at least one longitudinal recess extending in the axial direction parallel to the axis of rotation on an outer radial face of the bearing ring extends parallel to the axis of rotation uninterruptedly from a first axial end face to a second axial end face of the bearing ring.

15. The electrical machine of claim 10, wherein the at least one radial recess comprises at least one radially extending aperture.

* * * * *